Jan. 17, 1956   D. J. CAMPBELL, JR., ET AL   2,730,983
METHOD OF FORMING CEMENTED LOCK AND LAP
SIDE SEAMS HAVING WELDED LAP PORTIONS
Filed Dec. 11, 1952                             2 Sheets-Sheet 1
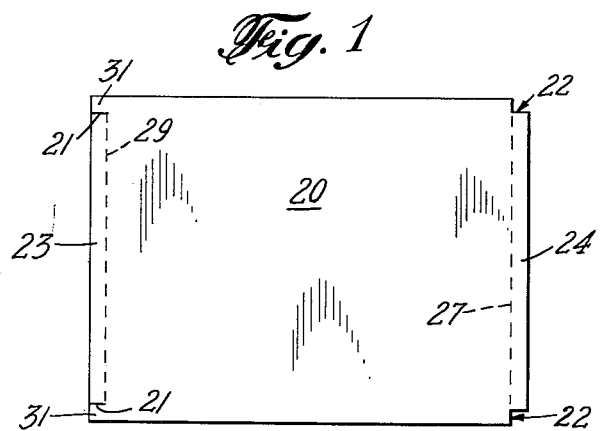
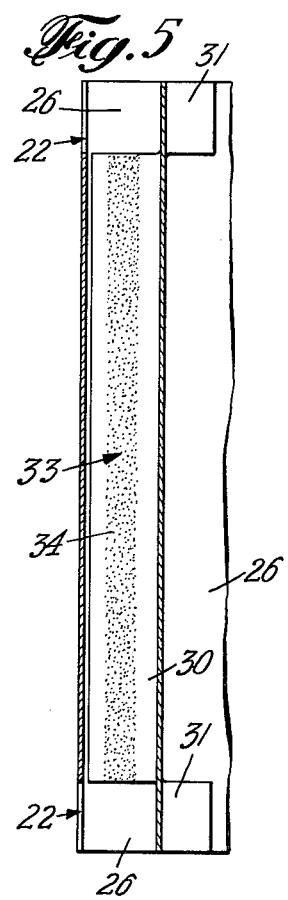
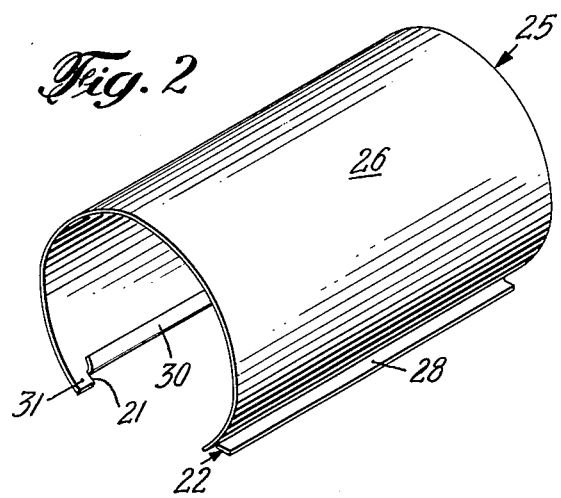
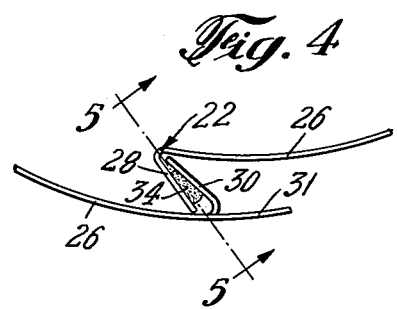
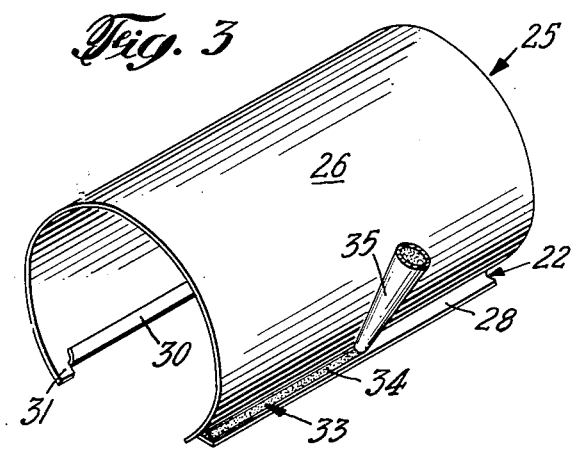
INVENTORS
DENIS J. CAMPBELL JR.
BY EDWARD W. KAISER
ATTORNEYS Jan. 17, 1956    D. J. CAMPBELL, JR., ET AL    2,730,983
METHOD OF FORMING CEMENTED LOCK AND LAP
SIDE SEAMS HAVING WELDED LAP PORTIONS
Filed Dec. 11, 1952      2 Sheets-Sheet 2

INVENTORS
DENIS J. CAMPBELL JR.
BY EDWARD W. KAISER
Charles H. Eme
Leland R. McCann
George W. Reiber
ATTORNEYS

United States Patent Office 2,730,983
Patented Jan. 17, 1956

2,730,983

METHOD OF FORMING CEMENTED LOCK AND LAP SIDE SEAMS HAVING WELDED LAP PORTIONS

Denis J. Campbell, Jr., Western Springs, and Edward W. Kaiser, Maywood, Ill., assignors to American Can Company, New York, N. Y., a corporation of New Jersey Application December 11, 1952, Serial No. 325,482

5 Claims. (Cl. 113—120)

The present invention relates to can body manufacture and more particularly to a method of making can bodies having cemented lock and lap type side seams wherein lap portions are welded together.

At the present time, the can manufacturing industry is for several reasons placing ever-increasing emphasis on the manufacture of can bodies having their side seams sealed by means of a suitable cement or sealing compound. One of the main reasons for this practice is that cemented side seams make it possible to manufacture a completely tinless and solderless can, thereby freeing the can manufacturer from dependence upon critical materials which presently are in short supply and which may become unobtainable in the event of a national emergency.

Furthermore, cemented side seams make it possible to produce fully lithographed cans of exceptionally attractive appearance, since there is no necessity for providing an unlithographed area on the exterior of the can bodies adjacent the side seams, as is the case in soldered can bodies where the solder is applied to the exteriors of the bodies after the seams have been formed.

As an additional advantage the use of cement as a seam sealing material obviates the necessity of fluxing the side seam area for subsequent soldering and thus eliminates the problem of flux corrosion of the body material which is always present whenever effective fluxes are utilized.

However, since the commonly used or currently available sealing cements produce a bond which is not strong as a solder bond, the lap portions of the cemented side seams have a tendency to separate during flanging or as a result of rough handling during shipment and storage. This problem of open laps which produce leaks after the cans have been filled and sealed is not new to the industry and has always been present, even in soldered side seams. Attempts to solve this problem have resulted in the production of can bodies with soldered side seams having welded lap portions as is evidenced in United States Patent 1,542,662 issued to Julius Brenzinger on June 16, 1925, and United States Patent 2,342,109 issued to Reid G. Atkinson on February 22, 1944.

In the manufacture of these types of soldered can bodies the body hooks are first interengaged and bumped together. The laps are then welded together and molten solder is thereafter applied to the exterior of the side seam and flows by capillarity into and throughout the seam to form a strong hermetic seal. This technique, however, cannot be applied to the manufacture of cemented side seams since none of the presently known cements possess the physical properties which would enable them to flow into and seal the seam if applied externally, as does the molten solder. Because of this limitation the cement must be applied to the can body before the seam is bumped and thus before the weld is made.

As a result, the very serious problem arises of maintaining those portions of the lap sections of the side seams which are to be subsequently welded completely free of cement, since all of the known cements are almost perfect electrical insulators and the presence of the slightest film of cement in the welding area will retard the flow of electrical current and prevent the formation of a secure, dependable weld.

The present invention contemplates overcoming this difficulty by providing a method of forming cemented can body side seams wherein the opposed longitudinal side seam edges of the can body blanks are bumped or pressed together in such a manner that the sealing cement, which has been previously applied to the hook portion of the seam, is extruded longitudinally from between the hooks onto those portions of the adjacent lap sections which are not in the welding area but is kept from flowing onto those portions of the lap sections which are to be welded together. The welding areas are thus maintained free of cement and the formation of a secure weld is thereby facilitated.

An object of the invention therefore is to provide a method which permits the production, at high-speeds under commercial automatic operating conditions, of cemented can body side seams having securely welded lap portions to prevent separation of the laps during subsequent treatment.

Another object is to provide a method of insuring the production of consistently good welds in selected portions of cemented can body side seam laps by maintaining those portions free of cement which would otherwise hamper the formation of the welds.

Numerous other objects and advantages of the invention will be apparent as it is better understood from the following description, which, taken in connection with the accompanying drawings discloses a preferred embodiment thereof.

Referring to the drawings:

Figure 1 is a plan view of a flat body blank suitable for use in the formation of a can body side seam made according to the method of the instant invention;

Fig. 2 is a perspective view of an unfinished tubular can body made from the blank of Fig. 1, showing opposed longitudinal edge portions reversely bent to form body hooks;

Fig. 3 is a perspective view similar to Fig. 2 showing the application of a bead of cement to one of the body hooks;

Fig. 4 is a fragmentary end elevation of a portion of the can body showing the body hooks interengaged preparatory to the bumping operation;

Fig. 5 is a sectional view taken substantially along the line 5—5 in Fig. 4;

Figure 9:
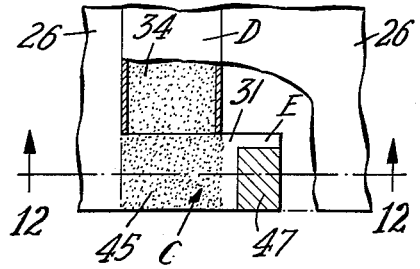
Figure 12:
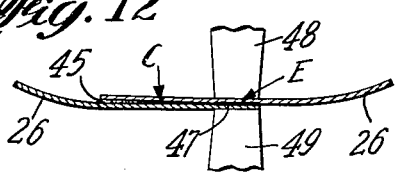
Figure 10:
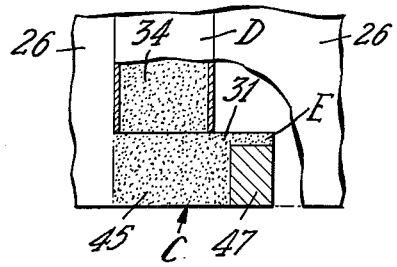
Figure 13:
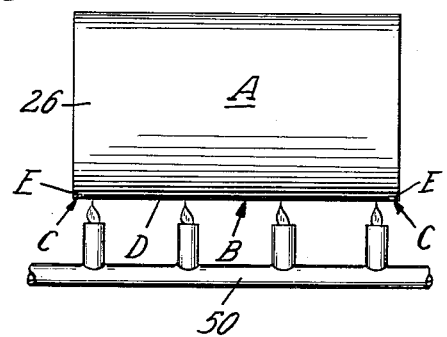

Fig. 12 is a section taken substantially along the line 12—12 of Fig. 9 showing a pair of electrodes in place for spot welding a portion of the lap section together, and Fig. 13 is a side elevation of a can body being heated by a gas burner after the welding operation of Fig. 12 has been completed in order to cause the cement to flow around and seal off the weld spot and produce the finished side seam as shown in Fig. 10.

Figure 7:
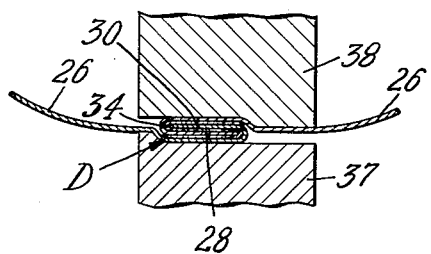
Fig. 7 is a section taken substantially along the line 7—7 of Fig. 6, showing one form of means for accomplishing the bumping operation.

As a preferred embodiment of the present invention, the drawings illustrate a method of providing a tubular can body A (Fig. 13) having a lock and lap seam B wherein the lap portions C (Fig. 12) are formed at the extremities of the lock portion D (Fig. 7). In the instant method, the can body A preferably is produced from a flat sheet metal can body blank 20 (Fig. 1) which is provided with slits 21 and notches 22 formed in its opposed longitudinal side seam edge portions 23, 24, respectively. As seen in Fig. 2 the flat blank 20 is bent into tubular shape to provide a partly completed can body 25 having a cylindrical body wall 26, and the longitudinal edge portion 24 is bent along the line 27 (see Fig. 1) to form an outwardly extending body hook 28 while the edge portion 23 between the slits 21 is bent along the line 29 to form an inwardly extending body hook 30. The unbent edge portions at the ends of the body hook 30 form tabs 31 which are laterally offset from the hook 30.

After the partially completed body 25 has been thus formed, a ribbon or bead 33 of a suitable sealing and bonding cement or compound 34 is applied to at least one of the body hooks, preferably to the full length of the outwardly bent hook 28, in any suitable manner, as by a nozzle 35 as shown in Fig. 3. The cement 34 may be of any type which is sufficiently fluid or flowable to permit application, but is preferably of the so-called hot-melt variety which usually consists of a blend of resins and plasticizers and which possesses insulating and thermoplastic properties and must be applied in a heated state. As an example of a suitable cement, reference may be had to John D. Czarnecki Patent 2,597,855 issued May 27, 1952, entitled "Plasticized Polyamides and Method of Preparation."

Figure 6:
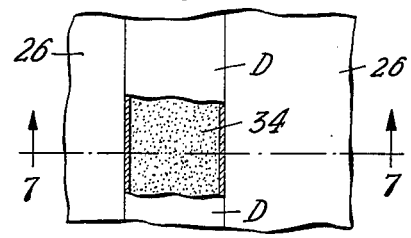
Fig. 6 is a fragmentary plan view of a portion of the lock section of a bumped can body side seam, a portion of the innermost layer of the seam being broken away to show the distribution of the sealing cement.

The opposed, reversely bent body hooks 28, 30 are next interengaged as seen in Fig. 4. This brings the bead 33 of cement, which is carried by the body hook 28, into contact with the opposing body hook 30 and disposes the offset tabs 31 to the outside of the body wall 26. After the hooks have been thus interengaged, they are pressed together, or bumped, in order to form the lock side seam portion D (see Figs. 6 and 7) which consists of four interlocked layers of metal. This bumping operation can be performed in any suitable manner, as for example, by means of the opposed bumping elements 37, 38 (Fig. 7) which may be the hammer and spline of a can bodymaker.

Figure 8:
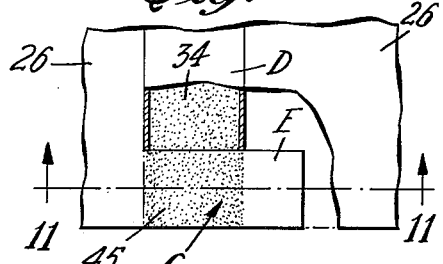
Figs. 8, 9, 10 are fragmentary plan views similar to Fig. 6 of an end portion of a bumped can body side seam which includes a lap section, a portion of the innermost layer of the seam being broken away, the views showing successive stages in the formation of the seam when utilizing the method of the instant invention.
Figure 11:
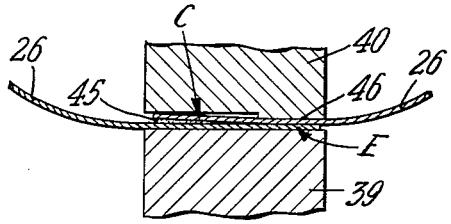
Fig. 11 is a section similar to Fig. 7, taken substantially along the line 11—11 of Fig. 8.

At about the time the hooks 28, 30 are being bumped, the portions of the can body wall 26 which are disposed adjacent the extremities of and in substantially longitudinal alignment with the hooks are also bumped to form the body lap portions C. The tabs 31 are also bumped against the body wall 26 to form welding or tab sections E (Fig. 8) which form integral extensions of and should be considered as parts of the body lap portions C. It is in these tab sections E that the spot welds will subsequently be made, as hereinafter described. This bumping of the laps may be effected, as shown in Fig. 11 of the drawings, by opposed bumping elements 39, 40 which may or may not be formed integral with the bumping elements 37, 38.

As seen in Fig. 4, the bead 33 of cement 34, at the start of the bumping operation, is disposed in the space between the opposed hooks 28, 30, which hooks become the inner layers of the four-layer lock seam section D. During the bumping operation, the bead 33 of cement 34 is flattened out and the cement 34 is forced to flow around the longitudinal edges of the hooks and into all three spaces between the four layers of the lock seam portion D (see Fig. 7) to effect a strongly bonded, hermetic seal. At the same time, at each end of the seam B a portion 45 of the cement 34 is squeezed or extruded longitudinally from between the layers of the lock seam portion D into the space between the layers of the lap portion C of the seam (see Fig. 8).

In order to prevent this longitudinally extruded cement 45 from flowing or spreading laterally into the welding or tab section E when the laps are bumped, this tab section E is solidly or tightly bumped to bring the tab 31 and the opposing portion of the body wall 26 into actual face-to-face or metal-to-metal engagement in order to eliminate any space between them into which the cement could flow. This is preferably effected, as shown in Fig. 11, by providing the bumping element 40 with a downwardly stepped section 46 to press the tab 31 and the wall 26 behind it solidly together, leaving the remaining portion of the lap bumped loosely or slightly separated to ensure a layer of cement therebetween in order to seal this portion of the side seam as a continuation of the seal in the lock seam D.

It sometimes happens that a small amount of the extruded cement 45 is squeezed laterally, but the major portion of the tab section E remains clean and uncontaminated by the cement, which at this stage is not sufficiently fluid to flow by capillarity into the tab section E when the pressure of the bumping elements is relieved after the bumping is completed, thus allowing the layers to separate slightly.

After the seam has been thus bumped, a spot weld 47 (see Fig. 9) is formed between the two cement-free layers of metal which comprise the tab section E in order to strengthen the lap and prevent it from opening at a later time. The weld 47 is preferably formed by a pair of electrodes 48, 49 (shown in elevation in Fig. 12) and may extend over substantially the whole area of the tab section E, or may, as shown in Fig. 9, be limited to a portion only thereof in order to minimize the flow of current and the duration of the welding operation.

If the cement used in the seam possesses thermoplastic properties, it is often desirable, after the welding operation, to heat the side seam area of the can body A by bringing it adjacent suitable heating means such as a gas burner 50 (see Fig. 13). This heat treatment increases the fluidity of the cement, which has a definite tendency to cool-off and solidify during the preceding seam-forming operations, thereby creating a capillary flow which ensures even distribution of cement throughout the seam. The portion 45 of the cement 34 on the lap section C, when so heated, flows by capillarity into unwelded areas of the tab section E around the spot weld 47 (see Fig. 10) and completes the bonding of the unwelded portions of the lap.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

We claim:

1. A method of forming a cemented side seam in a partially completed can body having lap portions and reversely bent body hooks with a flowable sealing cement on at least one of said hooks comprising interengaging said body hooks, bumping said interengaged body hooks to form a lock seam portion and to extrude a portion of said cement longitudinally from said lock seam portion, bumping selected portions of said body laps solidly together to prevent the entry of said extruded cement therebetween while bumping the remaining portions of said body laps loosely to permit the entry of said extruded cement therebetween, and welding said solidly bumped, uncemented lap portions together to hold said laps against separation during subsequent treatment.

2. A method of forming a cemented can body side seam, comprising bending opposed longitudinal edge portions of a can body blank to form body hooks while leaving other edge portions unbent to form body laps, applying a flowable sealing cement to at least one of said hooks, interengaging said body hooks, bumping said interengaged body hooks to form a lock seam portion and to distribute said cement in said lock seam portion and to extrude a portion of said cement longitudinally from said lock seam portion, bumping selected portions of said body laps solidly together to prevent the entry of said extruded cement therebetween while bumping the remaining portions of said body laps loosely to permit the entry of said extruded cement therebetween, and welding said solidly bumped, uncemented lap portions together to hold said laps against separation during subsequent treatment.

3. A method of forming a cemented can body side seam, comprising bending opposed longitudinal edge portions of a can body blank to form body hooks while leaving other edge portions unbent to form body laps, applying a flowable sealing cement to at least one of said hooks, interengaging said body hooks, bumping said interengaged body hooks to lock said hooks together and to distribute said cement between said locked hooks and to extrude a portion of said cement longitudinally from between said hooks, bumping selected portions of said body laps solidly together to prevent the entry of said extruded cement therebetween while bumping the remaining portions of said body laps loosely to permit the entry of said extruded cement therebetween, securing said solidly bumped, uncemented lap portions together in a spot weld to hold said laps against separation during subsequent treatment, and heating said side seam to flow said cement around said spot weld to completely seal laps against leakage.

4. A method of forming cemented can body side seams, comprising bending opposed longitudinal edge portions of a can body blank to form body hooks while leaving the other edge portions unbent to form body laps having extended tab sections laterally offset from said hooks, applying a flowable sealing cement to at least one of said hooks, interengaging said body hooks, bumping said interengaged body hooks to form a lock seam portion and to distribute said cement in said lock seam portion and to extrude a portion of said cement longitudinally from said lock seam portion, bumping said laterally offset tab sections solidly together to prevent the entry of said extruded cement therebetween while bumping the remaining portions of said body laps loosely to permit the entry of said extruded cement therebetween, and welding said solidly bumped, uncemented tab sections together to hold said laps against separation during subsequent treatment.

5. A method of forming cemented can body side seams, comprising bending opposed intermediate longitudinal edge portions of a can body blank to form body hooks while leaving the outer edge portions unbent to form body laps having extended tab sections laterally offset from said hooks, applying a flowable sealing cement to at least one of said hooks, interengaging said body hooks, bumping said interengaged body hooks to lock said hooks together and to distribute said cement around said locked hooks and to extrude a portion of said cement longitudinally from between said hooks, bumping said laterally offset tab sections solidly together to prevent the entry of said extruded cement therebetween while bumping the remaining portions of said body laps loosely to permit the entry of said extruded cement therebetween and to prevent said extruded cement from being squeezed laterally into said offset tab sections, welding portions of said solidly bumped, uncemented tab sections together to hold said laps against separation during subsequent treatment, and heating said side seam to cause said cement to flow between and seal off unwelded portions of said tab sections.

References Cited in the file of this patent

UNITED STATES PATENTS

| | | |
|---|---|---|
| 1,542,663 | Brenzinger | June 16, 1925 |
| 1,628,928 | Taylor | May 17, 1927 |
| 1,867,857 | Meyers | July 19, 1932 |
| 2,093,056 | Plumb | Sept. 14, 1937 |
| 2,124,004 | O'Neil | July 19, 1938 |
| 2,266,702 | Byers | Dec. 16, 1941 |
| 2,342,109 | Atkinson | Feb. 22, 1944 |
| 2,424,188 | Pearson | July 15, 1947 |